(12) United States Patent
Wegner

(10) Patent No.: US 12,024,763 B2
(45) Date of Patent: Jul. 2, 2024

(54) WIRE WITH PLATINUM COMPOSITION FOR CONTACTING TEMPERATURE SENSORS

(71) Applicant: Heraeus Deutschland Gmbh & Co. KG, Hanau (DE)

(72) Inventor: Matthias Wegner, Hanau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 524 days.

(21) Appl. No.: 17/448,765

(22) Filed: Sep. 24, 2021

(65) Prior Publication Data

US 2022/0106668 A1    Apr. 7, 2022

(30) Foreign Application Priority Data

Oct. 2, 2020  (EP) .................................... 20199749

(51) Int. Cl.
| | |
|---|---|
| *C22C 5/04* | (2006.01) |
| *B21C 1/02* | (2006.01) |
| *C22F 1/14* | (2006.01) |
| *G01K 7/18* | (2006.01) |
| *H01B 1/02* | (2006.01) |

(52) U.S. Cl.
CPC ............... *C22C 5/04* (2013.01); *B21C 1/02* (2013.01); *C22F 1/14* (2013.01); *G01K 7/18* (2013.01); *H01B 1/02* (2013.01)

(58) Field of Classification Search
CPC .... C22C 5/04; C22F 1/14; B21C 1/02; G01K 7/18; H01B 1/02
See application file for complete search history.

(56) References Cited

U.S. PATENT DOCUMENTS

| | | |
|---|---|---|
| 2,636,819 A | 4/1953 | Streicher |
| 4,507,156 A | 3/1985 | Roehrig |
| 8,436,520 B2 * | 5/2013 | Ma .......................... H01T 13/39 313/143 |

FOREIGN PATENT DOCUMENTS

| | | |
|---|---|---|
| DE | 2355122 A1 | 5/1975 |
| DE | 10211029 A1 | 10/2002 |
| DE | 102005038772 A1 | 2/2007 |
| EP | 0683240 A2 | 11/1995 |
| EP | 0870844 A1 | 10/1998 |
| EP | 0947595 A2 | 10/1999 |
| EP | 1188844 A1 | 3/2002 |
| EP | 1295953 A1 | 3/2003 |
| EP | 1964938 A1 | 9/2008 |
| GB | 1280815 A | 7/1972 |
| GB | 1340076 A | 12/1973 |
| GB | 2082205 A | 3/1982 |
| WO | WO-8101013 A1 | 4/1981 |
| WO | WO-2015082630 A1 | 6/2015 |

* cited by examiner

*Primary Examiner* — Randy W Gibson
(74) *Attorney, Agent, or Firm* — Blank Rome LLP

(57) ABSTRACT

The invention relates to a wire for electrically contacting temperature sensors, the wire consisting of at least 50 wt % of a platinum composition, the platinum composition containing between 2 wt % and 3.5 wt % tungsten, up to 47.95 wt % of at least one precious metal selected from the group consisting of rhodium, gold, iridium and palladium and mixtures thereof, between 0.05 wt % and 1 wt % oxides of at least one non-precious metal selected from the group consisting of (i) zirconium, (ii) aluminum and (iii) zirconium and at least one element selected from aluminum, yttrium and scandium, and, as the remainder, at least 50 wt % platinum including impurities. The invention also relates to a temperature sensor having such a wire, and to a method for producing such a wire and such a temperature sensor.

19 Claims, No Drawings

WIRE WITH PLATINUM COMPOSITION FOR CONTACTING TEMPERATURE SENSORS

CROSS REFERENCE TO RELATED APPLICATION

This application claims the benefit of European Application No. EP 20199749.1 filed Oct. 2, 2020, the entire contents of which are incorporated by reference herein

DESCRIPTION

The invention relates to a wire for electrically contacting temperature sensors, comprising a platinum composition, to a temperature sensor having at least one such wire, and to a method for producing such a wire and such a temperature sensor. The platinum composition consists of at least 50 wt % platinum (Pt) and 2% to 3.5 wt % tungsten (W) and contains 0.05% to 1 wt % of oxides of the non-precious metals zirconium (Zr) or aluminum (Al). The platinum composition may also contain up to 47.95 wt % of at least one of the precious metals rhodium, gold, iridium and palladium and may also contain, as part of the oxides, oxides of the non-precious metals yttrium (Y) and scandium (Sc) and, as the remainder, platinum including impurities.

Dispersion-hardened platinum wire (Pt DPH-A wire) is currently popular for use for electrically contacting thermistors and other temperature sensors under extreme conditions. These temperature sensors are used, inter alia, in the automotive industry for temperature measurement in exhaust gas lines or exhaust gas streams of cars (for example, to determine catalytic converter temperatures and/or exhaust gas temperatures). Under operating conditions, there are temperatures of 1,000° C. and higher, in a corrosive exhaust gas atmosphere. During the electrical contacting of the temperature sensors and the production of the wires, temperatures of 1,300° C. to 1,600° C. can occur. Such a temperature sensor is known, for example, from DE 102 11 029 B4. In addition to the thermal stress on the wire, there is also a mechanical stress on the component, for example due to vibrations. While dispersion-hardened platinum is characterized by excellent corrosion resistance, it often has inadequate mechanical properties.

The production, the processing and the physical properties of dispersion-hardened platinum compositions of this kind are known, for example, from GB 1 280 815 A, GB 1 340 076 A, GB 2 082 205 A, EP 0 683 240 A2, EP 0 870 844 A1, EP 0 947 595 A2, EP 1 188 844 A1, EP 1 295 953 A1, EP 1 964 938 A1, U.S. Pat. Nos. 2,636,819 A, 4,507,156 A, DE 23 55 122 A1, WO 81/01013 A1 and WO 2015/082630 A1.

Dispersion-solidified platinum compositions are usually produced by powder metallurgy or melting metallurgy by alloying zirconium (Zr) and optionally other non-precious metals such as yttrium (Y) or scandium (Sc), which are oxidized in a subsequent oxidation process to form zirconia ($ZrO_2$), yttria ($Y_2O_3$) and scandia ($SC_2O_3$).

It is therefore the object of the invention to overcome the drawbacks of the prior art. It is intended to retain the advantages of wire consisting of dispersion-hardened platinum as far as possible. In particular, a wire made of or with a platinum composition and a temperature sensor electrically contacted therewith are intended to be provided, it being intended for the platinum composition and the wire to be able to be produced in as inexpensive and uncomplicated a manner as possible. In addition, the wire is intended to have the highest possible strength and elongation at break. As a result, the wire can be processed in a temperature sensor, and the sensor can be used in extreme conditions, such as those found in an exhaust line of a car.

By means of the invention, the mechanical properties are intended to be improved, and the costs are intended to be reduced. In general, wires consisting of or containing platinum compositions of this kind are used primarily at high application temperatures in corrosive conditions in combination with significant mechanical stress, such as contact wires for electrically contacting temperature sensors in exhaust gas streams or engines.

The objects of the invention are achieved by a wire for electrically contacting temperature sensors, the wire consisting of at least 50 wt % of a platinum composition, the platinum composition containing
1) 2 wt % to 3.5 wt % tungsten,
2) up to 47.95 wt % of at least one precious metal selected from the group consisting of rhodium, gold, iridium and palladium and mixtures thereof,
3) 0.05% to 1 wt % of oxides of at least one non-precious metal selected from the group consisting of (i) zirconium, (ii) aluminum and (iii) zirconium and at least one element selected from aluminum, yttrium and scandium, and,
4) as the remainder, at least 50 wt % platinum including impurities.

According to the invention, oxides of zirconium or oxides of zirconium and oxides of yttrium and/or oxides of scandium are preferred as the 0.05 wt % to 1 wt % of oxides of the at least one non-precious metal.

The platinum composition is preferably a platinum-based alloy. A platinum-based alloy is understood to be an alloy which consists of at least 50 at. % platinum.

Preferably, 0.1 wt % to 0.7 wt %, particularly preferably 0.2 wt % to 0.5 wt % of the oxides of the at least one non-precious metal are contained in the platinum composition. High proportions of oxides of the non-precious metals result in higher strengths of the wire under mechanical stress. Wires containing platinum compositions with low proportions of non-precious metal oxides exhibit advantages in terms of processability, for example weldability or moldability, of the platinum composition for producing the wires.

According to a further development of the present invention, it may be provided that the platinum composition contains up to 30 wt % of at least one of the precious metals selected from the group consisting of rhodium, gold, iridium and palladium and mixtures thereof, preferably containing 0.5% to 30 wt % of at least one of these precious metals, particularly preferably containing 1% to 20 wt % of at least one of these precious metals, most particularly preferably containing 1% to 10 wt % of at least one of these precious metals.

Furthermore, it may be provided that the platinum composition comprises up to 10 wt % gold, up to 30 wt % rhodium, up to 30 wt % iridium or up to 47.95 wt % palladium as the at least one precious metal.

The platinum composition may be a pure platinum-tungsten composition, except for impurities that are usual or result from the production process, in which the oxides of the at least one non-precious metal zirconium or aluminum or zirconium and aluminum, yttrium and/or scandium are distributed. Furthermore, however, the platinum composition may also contain other precious metals, namely rhodium, gold, iridium and palladium, the platinum composition preferably being a platinum-based alloy in this case.

The impurities in the components of the platinum composition are understood to be usual impurities which get into the starting material due to and as part of the design process or which could not be (further or completely) removed from the raw materials with reasonable effort.

Preferably, it may be provided that the platinum composition is not produced by powder metallurgy.

In wires according to the invention, it may be provided that the platinum composition is dispersion-hardened.

A dispersion-hardened platinum composition of the composition according to the invention has precipitates of the oxides of the at least one non-precious metal in the matrix of platinum (platinum group metal) and tungsten, which results in hardening of the platinum composition.

Dispersion hardening improves the mechanical properties of the wire.

It may also be provided that the total proportion of the impurities in the platinum composition is at most 1 wt %, preferably at most 0.5 wt %.

This ensures that the physical properties of the platinum composition and thus of the wire are not influenced by the impurities or are influenced by the impurities as little as possible.

Furthermore, it may be provided that the wire consists of at least 90 wt % of the platinum composition, or the wire consists of the platinum composition, except for an outer coating or plating, or the wire consists of the platinum composition.

This ensures that the platinum composition determines the physical and, in particular, the mechanical properties of the wire. If a coating is present, this can specifically improve the electrical properties and in particular the electrical contactability of the wire or serve as a shield against corrosive media.

Furthermore, it may be provided that at least 50 mol. % of the oxides of the at least one non-precious metal are present as cubic zirconia stabilized with yttria and/or scandia, and preferably at least 80 mol. % of the oxides of the at least one non-precious metal is present as cubic zirconia stabilized with yttria and/or scandia.

It has been found that the oxygen diffusibility along the oxides can be increased by these measures, and thus the wire can be hardened by oxidation of the non-precious metals in a relatively short time in an oxidizing atmosphere. As a result, high oxygen diffusibility through the oxidation regions and therefore good oxidizability of the non-precious metals zirconium, yttrium and scandium is achieved in the platinum composition. As a result, the platinum composition can be hardened in a particularly short time by oxidative precipitation. In addition, a platinum composition or wire with particularly high tensile strength and elongation at break can thus be produced. In addition, stabilization of the cubic modification of the zirconia minimizes stress due to thermal shock.

Preferably, it may also be provided that the platinum composition is produced by melting metallurgy and subsequently oxidized by a temperature treatment in an oxidizing medium such that the non-precious metals contained in the platinum composition are completely oxidized, the platinum composition preferably being subsequently formed into the wire and particularly preferably annealed before and/or after this.

As a result, a particularly well-hardened platinum composition or a particularly well-hardened wire are produced.

It may be provided that the platinum composition contains at least 80 wt % platinum including impurities, the platinum composition preferably containing up to 17.95 wt % rhodium.

With the higher platinum content, fewer other precious metals are included in the platinum composition, and the platinum composition is therefore less expensive.

It may also be provided that the platinum composition contains at least 1 wt % of at least one precious metal selected from a group consisting of rhodium, gold, palladium and iridium, the platinum composition preferably containing at least 5 wt % rhodium as the at least one precious metal.

By adding the precious metals rhodium, gold, palladium and/or iridium, the mechanical properties of the platinum composition can be improved. In particular when adding rhodium, the high-temperature properties of the wire can be improved particularly advantageously.

Preferably, it may be further provided that the platinum composition consists of 2 wt % to 3.5 wt % tungsten, 5 wt % to 15 wt % rhodium, 0.05 wt % to 1 wt % of the oxides of at least one non-precious metal selected from the group consisting of (i) zirconium, (ii) aluminum and (iii) zirconium and at least one element selected from aluminum, yttrium and scandium, and, as the remainder, platinum including impurities, or the platinum composition consists of 2 wt % to 3.5 wt % tungsten, 0.05 wt % to 1 wt % of the oxides of at least one non-precious metal selected from the group consisting of (i) zirconium, (ii) aluminum and (iii) zirconium and at least one element selected from aluminum, yttrium and scandium, and, as the remainder, platinum including impurities.

As a result, it can be ensured that the platinum composition and thus the wire have the desired properties.

With a composition according to the invention, tensile strengths of at least 300 MPa, preferably at least 350 MPa, are achieved in the recrystallized state. Furthermore, the alloy has an elongation at break of at least 12%, preferably at least 15%. Due to the stabilization with zirconia, this combination of properties is substantially retained even if the material is subjected to temperatures greater than 1,300° C.

The material properties were determined in accordance with the standard DIN EN ISO 6892-1.

Furthermore, it may be provided that the wire has an elongation at break of at least 12%, preferably at least 15%.

Such wires have excellent processability and are therefore particularly suitable for production temperature sensors, for example. In addition, the wires are able to withstand the mechanical, thermal and chemical stresses that occur, for example, when using a temperature sensor to measure car exhaust gas temperatures.

It may also be provided that the platinum composition contains between 2.0 wt % and 3.0 wt % tungsten, preferably between 2.3 wt % and 2.8 wt % tungsten.

With these tungsten contents, a particularly good combination of tensile strength and elongation at break is achieved without sacrificing corrosion resistance.

The objects of the present invention are also achieved by a temperature sensor, in particular a high-temperature sensor, for determining the temperature, the temperature sensor comprising at least one such wire, preferably comprising two such wires.

Temperature sensors of this kind, in particular high-temperature sensors, have the advantages mentioned for the wire and are particularly well suited for use in areas with rapidly changing temperatures and also in vibrating environments, i.e. suited for use in the exhaust gas flow of motor vehicles.

It may be provided here that a thermal contact or a resistive structure, in particular a resistive layer, of the temperature sensor is electrically conductively connected to the at least one wire for electrical contacting, the temperature sensor preferably having two such wires, and one end of a first of the two wires being electrically conductively connected to one side of the thermal contact or the resistive structure or the resistive layer, and one end of a second of the two wires being electrically conductively connected to another side of the thermal contact or the resistive structure or the resistive layer.

Such a temperature sensor is usable particularly well in thermally, mechanically and chemically demanding environments.

The objects of the present invention are also achieved by a method for producing a platinum composition comprising the following chronological steps:

A) preparing a melt comprising between 2 wt % and 3.5 wt % tungsten, up to 47.95 wt % of at least one precious metal selected from the group consisting of rhodium, gold, iridium and palladium and mixtures thereof, 0.05 wt % to 1 wt % of at least one oxidizable non-precious metal selected from the group consisting of (i) zirconium, (ii) aluminum and (iii) zirconium and at least one element selected from aluminum, yttrium and scandium, and, as the remainder, at least 50 wt % platinum including impurities,
B) solidifying the melt to form a solid body,
C) processing the solid body to form a volume body, and
D) oxidizing the non-precious metals contained in the volume body by a heat treatment in an oxidizing medium over a time period of at least 24 hours at a temperature of at least 750° C., and
E) processing the volume body to form a wire.

It may be provided here that a wire according to the invention is produced, in particular drawn or pressed, by the method.

It may also be provided that, in step E), the solid body is first ductility-annealed at at least 1,300° C. for at least 1 hour and then drawn or pressed to form a wire, an annealing process preferably being performed at a temperature between 1,000° C. and 1,200° C. before, between and/or after drawing or pressing.

As a result, the processing of the solid body to form a wire is simplified, and the resulting wire has high strength and a high elongation at break.

Lastly, the objects of the present invention are also achieved by a method for producing a temperature sensor, characterized by producing a wire by such a method and electrically contacting a thermal contact or a resistive structure or a resistive layer with at least one piece of the wire, preferably with at least two pieces of the wire.

The wire can be coated before electrical contacting.

The invention is based on the surprising finding that, by adding tungsten to a wire consisting of or containing a dispersion-hardened platinum composition, it is possible to significantly increase the tensile strength of the wire, while the elongation at break of the wire does not deteriorate or hardly deteriorates. The wire according to the invention is thus usable for application as an electrical contacting wire for high-temperature sensors in cars, engines and other machines in which temperature changes, high temperatures and simultaneous vibrations and mechanical stress as well as a chemically corrosive environment coincide.

Furthermore, less precious metal is used in wires according to the invention, due to the use of tungsten instead of platinum (even if only to a small extent), and there is thus an additional financial advantage.

Exemplary embodiments of the invention are explained below without, however, limiting the invention.

Dispersion-solidified or dispersion-hardened platinum-tungsten alloys, i.e. platinum alloys containing 2.1 wt % tungsten (PtW2.1 DPH-A) and 2.4 wt % tungsten (PtW2.4 DPH-A), respectively, and dispersion-hardened platinum (Pt DPH-A) known from the prior art for comparison, were produced. By adding 2.1 wt % or 2.4 wt % tungsten to a dispersion-hardened platinum alloy, it was possible to maintain the very good elongation at break of around 15%, while at the same time tripling the yield strength and doubling the tensile strength.

The material was produced as follows:

The platinum compositions described in the following were produced by an ingot with a weight of 2.5 kg being cast from the melt by vacuum induction melting. Two different platinum compositions were produced in this way, namely 2.1 wt % tungsten, 1800 ppm zirconium, 300 ppm yttrium, 50 ppm scandium and, as the remainder, platinum including impurities (PtW2.1 DPH-A) and 2.4 wt % tungsten, 1800 ppm zirconium, 300 ppm yttrium, 50 ppm scandium and, as the remainder, platinum including impurities (PtW2.4 DPH-A). The non-precious metals zirconium, yttrium and scandium were added during the vacuum induction melting.

The ingot was cast in a vacuum induction melt, then rolled to 2.5 mm and oxidized (900° C. for 24 days) until complete transformation of the non-precious metals Zr, Y and Sc into the oxides thereof. A ductility annealing process (1,400° C. for 6 hours) was then performed, and with an intermediate annealing process in a continuous furnace at 1,100° C. at 1 mm and 1 m/min, the material was drawn to final size (wire diameter 0.25 mm), and a final annealing process was performed in the continuous furnace at 1,100° C. at a drawing speed of 1 m/min. The temperature of 1,100° C. was chosen because the material recrystallizes completely within a short time at this temperature.

The reference material Pt DPH-A was similarly produced, only the addition of tungsten was omitted.

The mechanical properties were then determined experimentally in a tensile test.

Wires with a diameter of 0.252 mm were produced from the platinum composition PtW2.1 DPH-A, and wires with the same diameter of 0.252 mm were produced from the platinum composition PtW2.4 DPH-A.

In addition, wires with a diameter of 0.246 mm were produced from the platinum composition Pt DPH-A for comparison.

For the wires of platinum compositions PtW2.1 DPH-A and PtW2.4 DPH-A, the following parameters were used in the experiment setup to determine the mechanical properties listed below: Initial force 10 N/mm$^2$, speed for yield strength 1 mm/min, speed for modulus of elasticity 1 mm/min, and test speed 10 mm/min. For the wires of platinum composition Pt DPH-A with 0.246 mm, the following parameters were used: Initial force 5 N/mm$^2$, speed for yield strength 1 mm/min, speed for modulus of elasticity 1 mm/min, and test speed 10 mm/min. The low initial forces when clamping the samples in the measuring apparatus do not change the structure of the wires and therefore have no influence on the measurement results.

For the wires of platinum compositions PtW2.1 DPH-A, PtW2.4 DPH-A and Pt DPH-A with a 0.25 mm diameter, five wires of each were measured and used for the following values by averaging and calculating the standard deviations (s). Furthermore, the mechanical properties of the wires were determined after an additional further annealing process for a period of 1 hour at 1,400° C. to test the temperature stability at extremely high temperatures.

TABLE 1

Measured values for the mechanical properties of the measured wires

| Pt DPH-A 0.246 mm: | | |
|---|---|---|
| $R_{p0.2}$ | 64.5 N/mm² | (s = 1.2 N/mm²) |
| $R_m$ | 174.7 N/mm² | (s = 3.1 N/mm²) |
| $F_m$ | 8.3 N | (s = 0.1 N) |
| A 100 mm | 13.18% | (s = 1.92%) |
| PtW2.1 0.252 mm: | | |
| $R_{p0.2}$ | 192.7 N/mm² | (s = 0.8 N/mm²) |
| $R_m$ | 353.6 N/mm² | (s = 0.7 N/mm²) |
| $F_m$ | 17.64 N | (s = 0.03 N) |
| A 100 mm | 16.51% | (s = 0.75%) |
| PtW2.4 0.252 mm: | | |
| $R_{p0.2}$ | 209.1 N/mm² | (s = 3.2 N/mm²) |
| $R_m$ | 373.1 N/mm² | (s = 2.3 N/mm²) |
| $F_m$ | 18.61 N | (s = 0.11 N) |
| A 100 mm | 16.82% | (s = 0.32%) |
| PtW2.1 0.252 mm, additional annealing 1,400° C. 1 h: | | |
| $R_{p0.2}$ | 182.6 N/mm² | (s = 0.3 N/mm²) |
| $R_m$ | 344.9 N/mm² | (s = 0.4 N/mm²) |
| $F_m$ | 17.20 N | (s = 0.02 N) |
| A 100 mm | 17.27% | (s = 0.82%) |
| PtW2.4 0.252 mm, additional annealing 1,400° C. 1 h: | | |
| $R_{p0.2}$ | 195.0 N/mm² | (s = 3.2 N/mm²) |
| $R_m$ | 359.7 N/mm² | (s = 0.1 N/mm²) |
| $F_m$ | 17.94 N | (s = 0.01 N) |
| A 100 mm | 16.44% | (s = 0.23%) |

$R_{p0.2}$ is the yield strength or 0.2% proof stress, $R_m$ is the tensile strength, $F_m$ is the maximum force, A 100 mm is the elongation at break, and s is the standard deviation from the mean. The tensile tests were performed on a Zwick Roell Z250 floor-standing testing machine.

The advantageous technical effect of the wires according to the invention containing or consisting of the platinum composition, which can be seen in the high tensile strength with a simultaneously high elongation at break, was achieved by a suitable combination of platinum and tungsten and oxide dispersion hardening (on the basis of zirconia, but said effect can also be expected for alumina and is therefore also transferable to alumina). The amount of tungsten and oxide formers was chosen to significantly improve the mechanical properties (in particular in direct comparison with a Pt DPH-A alloy without the addition of tungsten), without reducing the oxidation or corrosion resistance below a critical level, so that the material of the wire does not degrade and, in the worst case, fail under operating conditions (for example, in hot exhaust gases of an internal combustion engine).

The high elongation at break is very unusual for dispersion-hardened platinum and dispersion-hardened platinum alloys. These are usually much more brittle. The high elongation at break is presumably favored by the production from the melt and by the internal oxidation of the non-precious metals zirconium, aluminum, yttrium and/or scandium for dispersion-hardened platinum alloys. In particular, in the embodiment with zirconia stabilized by yttrium and/or scandium, this process is accompanied by stabilization of the cubic high-temperature phase of the zirconia by yttrium oxide and/or scandium oxide such that said phase is stable over the entire temperature range. Non-stabilized zirconia exists in three crystalline modifications with transitions from monoclinic to tetragonal at about 1,170° C. and finally to cubic crystal structure at about 2,370° C.

The features of the invention disclosed in the above description, as well as in the claims, drawings and exemplary embodiments, may be essential both individually and in any combination for realizing the invention in its various embodiment.

The invention claimed is:

1. A wire for electrically contacting temperature sensors, the wire consisting of at least 50 wt % of a platinum composition, the platinum composition containing
   2 wt % to 3.5 wt % tungsten,
   up to 47.95 wt % of at least one precious metal selected from the group consisting of rhodium, gold, iridium and palladium and mixtures thereof,
   0.05% to 1 wt % of oxides of at least one non-precious metal selected from the group consisting of (i) zirconium, (ii) aluminum and (iii) zirconium and at least one element selected from aluminum, yttrium and scandium, and,
   as the remainder, at least 50 wt % platinum including impurities.

2. The wire of claim 1, wherein the platinum composition is dispersion-hardened.

3. The wire of claim 1, wherein the wire has an elongation at break of at least 12%.

4. The wire according to of claim 1, wherein the total proportion of the impurities in the platinum composition is at most 1 wt %.

5. The wire of claim 1, wherein the wire consists of at least 90 wt % of the platinum composition, or the wire consists of the platinum composition except for an outer coating or plating, or the wire consists of the platinum composition.

6. The wire of claim 1, wherein at least 50 mol. % of the oxides of the at least one non-precious metal is cubic zirconia stabilized with yttria or scandia or yttria and scandia.

7. The wire of claim 1, wherein the platinum composition is produced by melting metallurgy and is subsequently oxidized by a temperature treatment in an oxidizing medium such that the non-precious metals contained in the platinum composition are at least 90% oxidized or completely oxidized.

8. The wire of claim 1, wherein the platinum composition contains at least 80 wt % platinum including impurities and up to 17.95 wt % rhodium.

9. The wire of claim 1, wherein the platinum composition contains at least 1 wt % of the at least one precious metal.

10. The wire of claim 1, wherein
    the platinum composition consists of 2 wt % to 3.5 wt % tungsten, 5 wt % to 15 wt % rhodium, 0.05 wt % to 1 wt % of the oxides of at least one non-precious metal selected from the group consisting of (i) zirconium, (ii) aluminum and (iii) zirconium and at least one element selected from aluminum, yttrium and scandium, and, as the remainder, platinum including impurities, or
    the platinum composition consists of 2 wt % to 3 wt % tungsten, 0.05 wt % to 1 wt % of the oxides of at least one non-precious metal selected from the group consisting of (i) zirconium, (ii) aluminum and (iii) zirconium and at least one element selected from aluminum, yttrium and scandium, and, as the remainder, platinum including impurities.

11. The wire of claim 1, wherein the platinum composition contains between 2.0 wt % and 3.0 wt % tungsten.

12. A temperature sensor, the temperature sensor comprising at least one wire according to claim 1.

13. The temperature sensor of claim 12, wherein a thermal contact or a resistive structure of the temperature sensor is electrically conductively connected to the at least one wire for electrical contacting and one end of a first of the two wires being electrically conductively connected to one side of the thermal contact or the resistive structure, and one end of a second of the two wires being electrically conductively connected to another side of the thermal contact or the resistive structure.

14. A method for producing a platinum composition comprising the following chronological steps:
A) preparing a melt comprising between 2 wt % and 3.5 wt % tungsten, up to 47.95 wt % of at least one precious metal selected from the group consisting of rhodium, gold, iridium and palladium and mixtures thereof, 0.05 wt % to 1 wt % of at least one oxidizable non-precious metal selected from the group consisting of (i) zirconium, (ii) aluminum and (iii) zirconium and at least one element selected from aluminum, yttrium and scandium, and, as the remainder, at least 50 wt % platinum including impurities,
B) solidifying the melt to form a solid body,
C) processing the solid body to form a volume body,
D) oxidizing the non-precious metals contained in the volume body by a heat treatment in an oxidizing medium over a time period of at least 24 hours at a temperature of at least 750° C., and
E) processing the volume body to form a wire.

15. The method of claim 14, wherein processing the volume body to form the wire comprises drawing or pressing.

16. The method of claim 14, wherein in step E), the solid body is first ductility-annealed at a temperature of at least 1,300° C. for at least 1 hour and then drawn or pressed to form the wire.

17. The method of claim 16, wherein annealing at a temperature between 1,000° C. and 1,200° ° C. is carried out before and/or after drawing or pressing.

18. A method for producing a temperature sensor, the method comprising:
producing a wire by a method according to claim 14, and
electrically contacting a thermal contact or a resistive structure or a resistive layer with at least one piece of the wire.

19. The wire of claim 1, wherein at least 80 mol. % of the oxides of the at least one non-precious metal is cubic zirconia stabilized with yttria or scandia or yttria and scandia.

* * * * *